United States Patent
Kamali et al.

(10) Patent No.: US 7,599,629 B2
(45) Date of Patent: Oct. 6, 2009

(54) OPTICAL RECEIVER HAVING AN OPEN LOOP AUTOMATIC GAIN CONTROL CIRCUIT

(75) Inventors: Walid Kamali, Duluth, GA (US); John Skrobko, Berkeley Lake, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 776 days.

(21) Appl. No.: 10/456,817

(22) Filed: Jun. 6, 2003

(65) Prior Publication Data
US 2004/0247327 A1    Dec. 9, 2004

(51) Int. Cl.
*H04B 10/06*    (2006.01)
(52) U.S. Cl. .................................. 398/202
(58) Field of Classification Search ............ 398/202, 398/208–210; 250/214 AG; 327/308
See application file for complete search history.

(56) References Cited

U.S. PATENT DOCUMENTS

| | | | | |
|---|---|---|---|---|
| 2,238,023 A | * | 4/1941 | Klipsch | 333/28 T |
| 3,680,013 A | * | 7/1972 | Pye | 333/81 R |
| 4,459,557 A | * | 7/1984 | McQuilken | 330/282 |
| 4,875,023 A | * | 10/1989 | Maoz | 333/81 R |
| 4,975,604 A | * | 12/1990 | Barta | 327/308 |
| 5,282,072 A | * | 1/1994 | Nazarathy et al. | 398/193 |
| 5,519,530 A | | 5/1996 | Utsumi | 359/264 |
| 5,666,089 A | * | 9/1997 | Ehlers | 333/81 R |
| 5,724,170 A | | 3/1998 | Aizawa | 398/197 |
| 5,768,694 A | * | 6/1998 | Kumagai | 455/126 |
| 5,796,286 A | * | 8/1998 | Otaka | 327/308 |
| 5,912,599 A | * | 6/1999 | Beall | 333/81 R |
| 6,137,607 A | | 10/2000 | Feldman et al. | 398/167.5 |
| 6,256,329 B1 | | 7/2001 | Ishizuka et al. | 372/38.02 |
| 6,282,216 B1 | | 8/2001 | Ikeuchi et al. | 372/29.015 |
| 6,483,632 B1 | * | 11/2002 | Jolley et al. | 359/337.4 |
| 6,507,603 B1 | * | 1/2003 | Haga et al. | 375/147 |
| 2002/0075919 A1 | | 6/2002 | Tochio | 372/38.02 |

(Continued)

FOREIGN PATENT DOCUMENTS

JP    62066745    3/1987

(Continued)

OTHER PUBLICATIONS

Weik, Martin A. "automatic gain control." Fiber Optics Standard Dictionary. 3rd ed. 1997.*

(Continued)

*Primary Examiner*—Leslie Pascal
(74) *Attorney, Agent, or Firm*—Tarolli, Sundheim, Covell & Tummino LLP

(57) ABSTRACT

The present invention is directed towards an optical receiver including an open loop automatic gain control (AGC) circuit. Optical signals received by the optical receiver are converted to electrical signals via a photodiode. The electrical signals are subsequently amplified through an input and an output amplifier stage. The amplified signal is then converted to RF signals and provided to an output port for further transmission. Concurrently, the AGC circuit senses the input optical power level at the input photodiode. The input optical power level is compared with a reference voltage, thereby providing a difference voltage. The difference voltage is applied to input and output amplifier stages for correcting the electrical signals to ensure a constant output power level.

6 Claims, 6 Drawing Sheets

U.S. PATENT DOCUMENTS

| | | | |
|---|---|---|---|
| 2003/0090320 A1 | 5/2003 | Skrobko | |
| 2004/0119547 A1* | 6/2004 | Ravi et al. | 331/182 |
| 2004/0179674 A1* | 9/2004 | Orr et al. | 379/387.01 |
| 2004/0253003 A1* | 12/2004 | Farmer et al. | 398/214 |
| 2007/0177884 A1* | 8/2007 | Kagaya et al. | 398/202 |

FOREIGN PATENT DOCUMENTS

| | | | |
|---|---|---|---|
| JP | 05206780 A | * | 8/1993 |
| JP | 07058563 A | * | 3/1995 |
| JP | 2002044030 | | 2/2002 |
| WO | WO 2004008667 A1 | * | 1/2004 |

OTHER PUBLICATIONS

Bayruns, J. et al. "A monolithic DC-1.6 GHz digital attenuator." IEEE MTT-S International Microwave Symposium Digest, 1989. Jun, 13-15, 1989: 1295-1298, vol. 3.*

McGrath, F.J. et al. "An ultra broadband DC-12 GHz 4-bit GaAs monolithic digital attenuator." 13th Annual Gallium Arsenide Integrated Circuit (GaAs IC) Symposium, 1991. Technical Digest 1991. Oct. 20-23, 1991: 247-250.*

Microsemi Corporation. The PIN Diode Circuit Designers' Handbook. Watertown, MA: Microsemi Corporation, 1998.*

* cited by examiner

OPTICAL RECEIVER HAVING AN OPEN LOOP AUTOMATIC GAIN CONTROL CIRCUIT

FIELD OF THE INVENTION

This invention relates generally to broadband communications systems, such as cable television networks, and more specifically to an optical receiver that is suitable for use in the broadband communications system, the optical receiver including an open loop gain control circuit for ensuring a constant output level of the optical receiver.

BACKGROUND OF THE INVENTION

FIG. 1 is a block diagram illustrating an example of a conventional ring-type broadband communications system, such as a two-way hybrid fiber/coaxial (HFC) network. It will be appreciated that other networks exist, such as a star-type network. These networks may be used in a variety of systems, including, for example, cable television networks, voice delivery networks, and data delivery networks to name but a few. The broadband signals transmitted over the networks include multiple information signals, such as video, voice, audio, and data, each having different frequencies. Headend equipment included in a headend facility 105 receives incoming information signals from a variety of sources, such as off-air signal source, a microwave signal source, a local origination source, and a satellite signal source and/or produces original information signals at the facility 105. The headend 105 processes these signals from the sources and generates forward, or downstream, broadcast signals that are delivered to a plurality of subscriber equipment 110. The broadcast signals can be digital or analog signals and are initially transported via optical fiber 115 using any chosen transport method, such as SONET, gigabit (G) Ethernet, 10 G Ethernet, or other proprietary digital transport methods. The broadcast signals are typically provided in a forward bandwidth, which may range, for example, from 45 MHz to 870 MHz. The information signals may be divided into channels of a specified bandwidth, e.g., 6 MHz, that conveys the information. The information is in the form of carrier signals that transmit the conventional television signals including video, color, and audio components of the channel. Also transmitted in the forward bandwidth may be telephony, or voice, signals and data signals.

Optical transmitters (not shown), which are generally located in the headend facility 105, convert the electrical broadcast signals into optical broadcast signals. In most networks, the first communication medium 115 is a long haul segment that transports the signals typically having a wavelength in the 1550 nanometer (nm) range. The first communication medium 115 carries the broadcast optical signal to hubs 120. The hubs 120 may include routers or switches to facilitate routing the information signals to the correct destination location (e.g., subscriber locations or network paths) using associated header information. The optical signals are subsequently transmitted over a second communication medium 125. In most networks, the second communication medium 125 is an optical fiber that is typically designed for shorter distances, and which transports the optical signals over a second optical wavelength, for example, in the 1310 nm range.

From the hub 120, the signals are transmitted to an optical node 130 including an optical receiver and a reverse optical transmitter (not shown). The optical receiver converts the optical signals to electrical, or radio frequency (RF), signals for transmission through a distribution network. The R-F signals are then transmitted along a third communication medium 135, such as coaxial cable, and are amplified and split, as necessary, by one or more distribution amplifiers 140 positioned along the communication medium 135. Taps (not shown) further split the forward RF signals in order to provide the broadcast RF signals to subscriber equipment 110, such as set-top terminals, computers, telephone handsets, modems, televisions, etc. It will be appreciated that only one subscriber location 110 is shown for simplicity, however, each distribution branch may have as few as 500 or as many as 2500 subscriber locations. Additionally, those skilled in the art will appreciate that most networks include several different branches connecting the headend facility 105 with several additional hubs, optical nodes, amplifiers, and subscriber equipment. Moreover, a fiber-to-the-home (FTTH) network 145 may be included in the system. In this case, optical fiber is pulled to the curb or directly to the subscriber location and the optical signals are not transmitted through a conventional RF distribution network.

In a two-way network, the subscriber equipment 110 generates reverse RF signals, which may be generated for a variety of purposes, including video signals, e-mail, web surfing, pay-per-view, video-on-demand, telephony, and administrative signals. These reverse RF signals are typically in the form of modulated RF carriers that are transmitted upstream in a typical United States range from 5 MHz to 40 MHz through the reverse path to the headend facility 105. The reverse RF signals from various subscriber locations are combined via the taps and passive electrical combiners (not shown) with other reverse signals from other subscriber equipment 110.

The preferred specification for a communications system, such as a cable television system, is to have a constant RF output level at the amplifier input or at the subscriber equipment input. Disadvantageously, various factors, such as transmitter output drift or connector loss changes, contribute negatively to the RF output level, and consequently degrade the quality of the signal preventing a constant level. Accordingly, communications equipment include correction circuits in order to adjust for these negative factors that cause variation in the RF output level. Thus, the present invention is a circuit directed towards ensuring a constant RF output level in optical receivers that are suitable for use in the communications system of FIG. 1.

DETAILED DESCRIPTION OF A PREFERRED EMBODIMENT

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully hereinbelow.

Specifically, the present invention is directed towards an open loop automatic gain control (AGC) circuit that is suitable for use in an optical receiver. Briefly, the optical receiver includes a photodiode, e.g., a PIN diode, for converting received optical signals into electrical RF signals. The optical receiver further includes an amplification circuit including, for example, push-pull transimpedance amplifiers that amplify the electrical signal for further transmission through the communications system. Notably, the optical receiver in accordance with the present invention includes an open-loop circuit for ensuring a constant RF output level that is required by equipment located further downstream.

Figure 1:
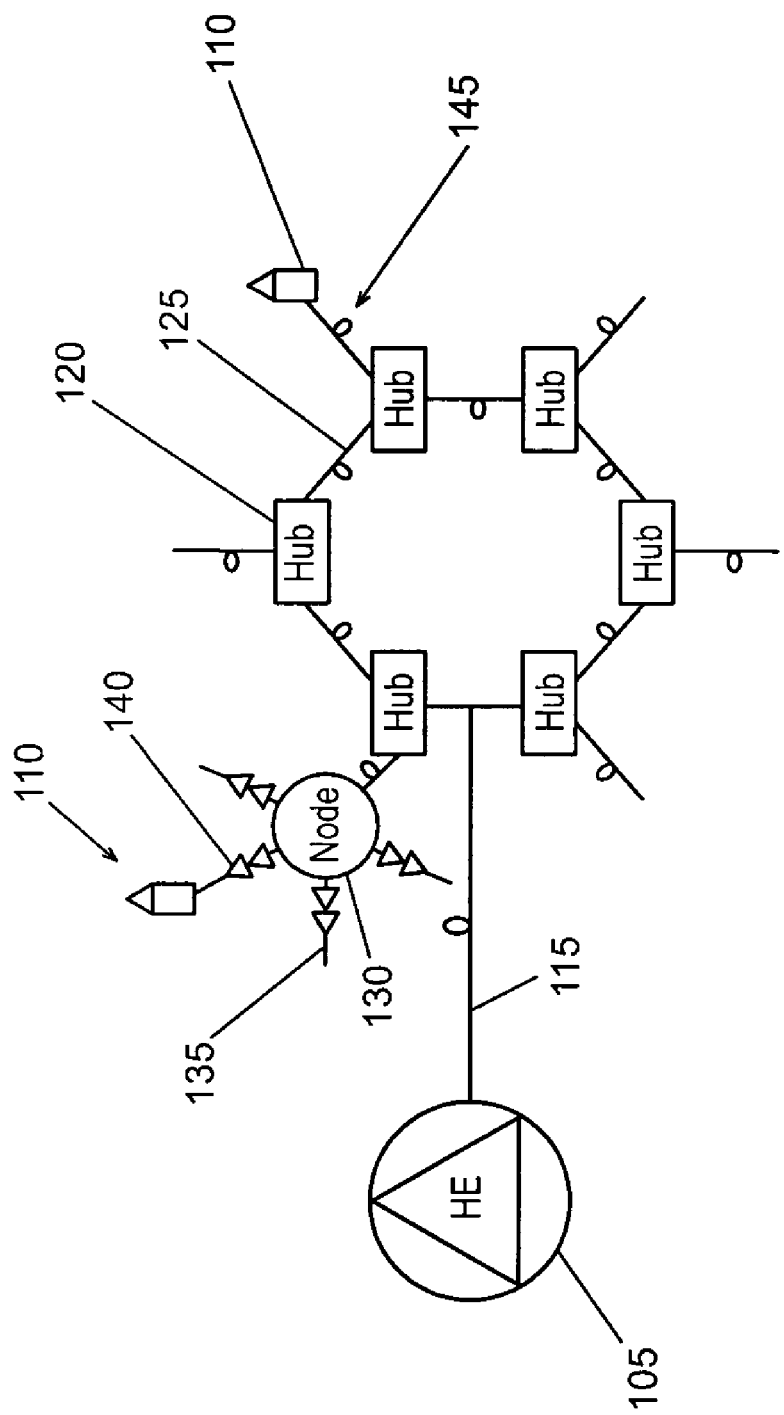
FIG. 1 is a block diagram illustrating an example of a conventional ring-type broadband communications system, such as a two-way hybrid/fiber coaxial (HFC) network.
Figure 2:
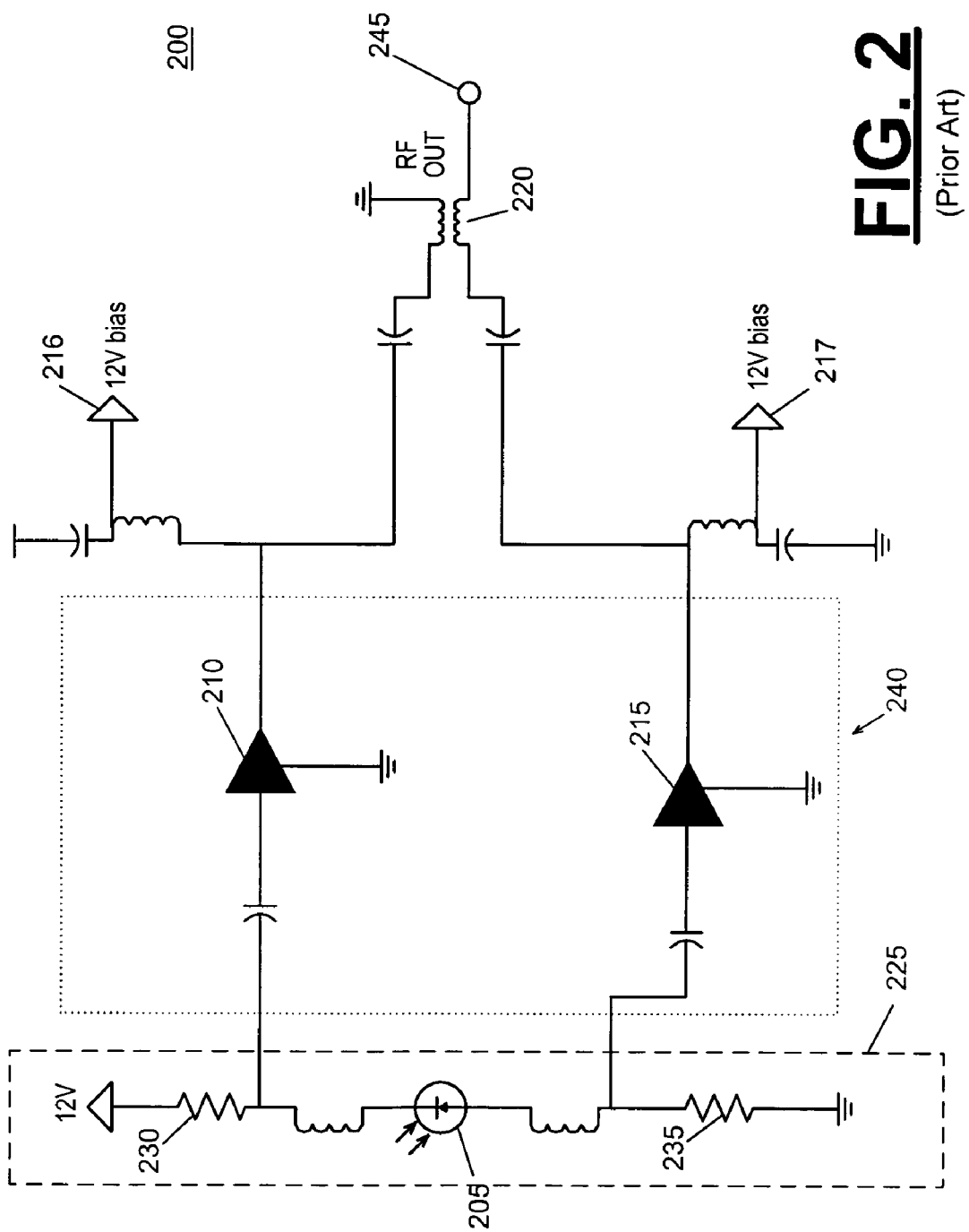
FIG. 2 is a schematic of a conventional optical receiver that is suitable for use in the headend facility and in the optical nodes and/or FTTH receive for receiving optical signals and for providing electrical signals.

FIG. 2 is a schematic of a conventional optical receiver 200 that is suitable for use in the headend facility 105 and in the nodes 130 for receiving optical signals and for providing electrical signals. Included in the optical receiver 200 is a photodiode 205 for receiving the optical signals and for providing electrical signals in accordance therewith. An amplification stage 240 amplifies the electrical signals prior to combining the electrical signals into a single RF electrical signal. The amplification stage 240 may include two push-pull (P-P) transimpedance amplifiers 210 and 215, for example. The transimpedance amplifiers may be constructed but not limited to GaAs PHEMTs configured in a cascade form. The P-P amplifiers 210, 215 are differentially driven from both ends of the diode 205. Two power supplies 216, 217, for example, 12 volt (V) power supplies, each power one of the amplifiers 210, 215. Finally, a balanced-to-unbalanced electrical transformer, i.e., balun 220, or other combining means is typically used to provide the combined RF electrical signal. It will be appreciated that the amplification stage 240 can be designed in different ways, for example, instead of using the P-P amplifiers, a single ended amplifier may be used. It will also be appreciated that the amplification stage 240 can be discrete components that are assembled on the printed circuit board, or preferably, can be included in a monolithic Gallium Arsenide (GaAs) chip or Silicon Germanium (Si—Ge) microelectronic monolithic circuit, for example.

Figure 3:
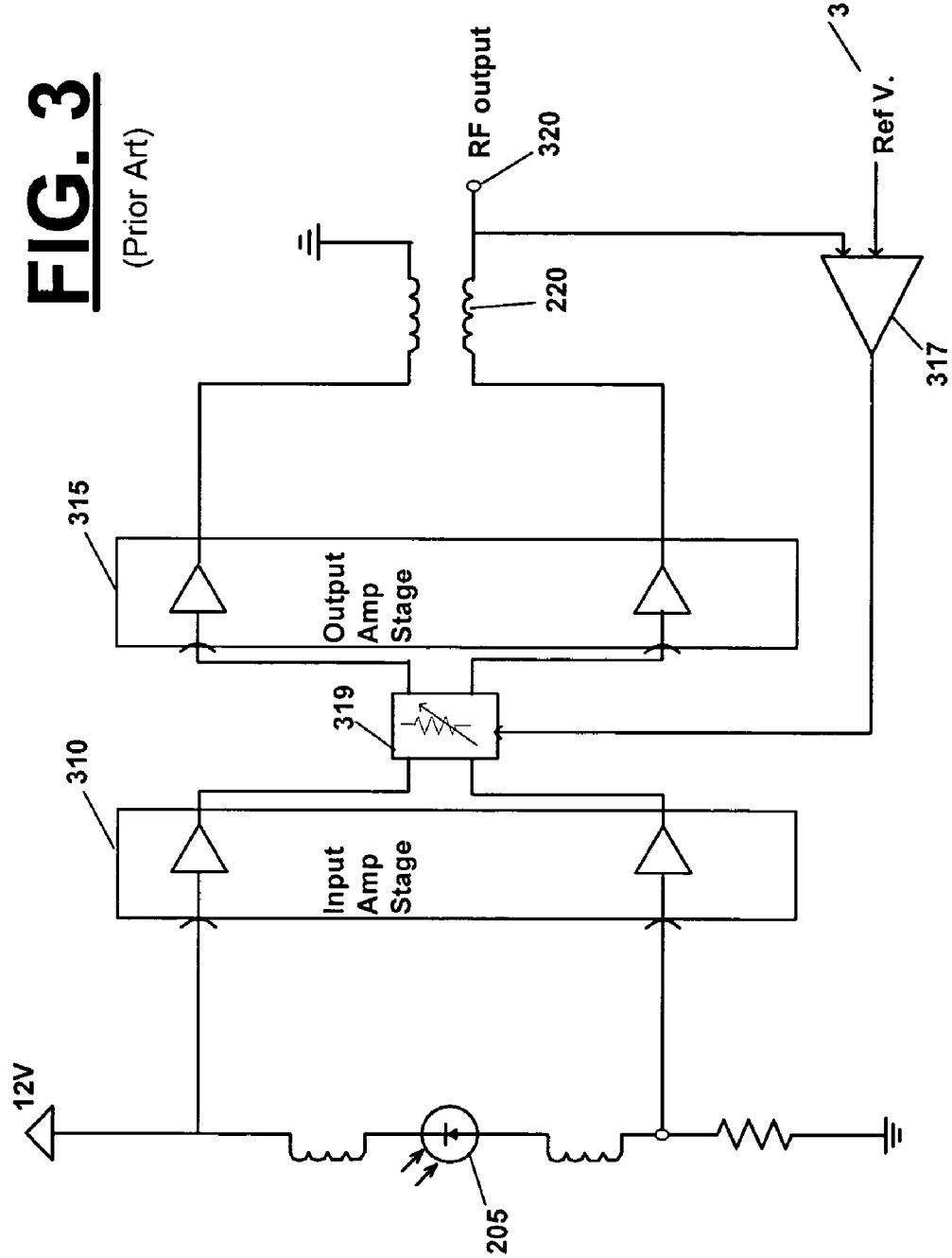
FIG. 3 illustrates an optical receiver including a closed-loop gain control circuit that monitors the output level of the optical receiver.

Disadvantageously, the optical receiver 200 of FIG. 2 does not include a gain control circuit to compensate for the wide possible input optical power level from the system. FIG. 3 illustrates an optical receiver including a conventional closed-loop gain control circuit that monitors the output level of the optical receiver. Also included are an input amplification stage 310 and an output amplification stage 315 that each amplify the electrical signals. The closed-loop gain control circuit compares the output RF power level from the output amplification stage 315 with a comparator 317 and a reference voltage 318, which is the desired output RF power level. Any detected deviation is then adjusted by attenuating the interstage RF power level with variable attenuator 319. Accordingly, the RF output power level 320 is adjusted to a constant level. It will be appreciated, however, that the closed loop gain control circuit introduces losses in the system that affects the processing accuracy of, for example, the receiving set-top devices. Other conventional gain control circuits may comprise a stepped attenuator (not shown) that attenuates the interstage power level in discrete steps. If a gain control circuit is not included in the optical receiver, some corrective design should be included in the amplifiers or the set-top devices located downstream.

Figure 4:
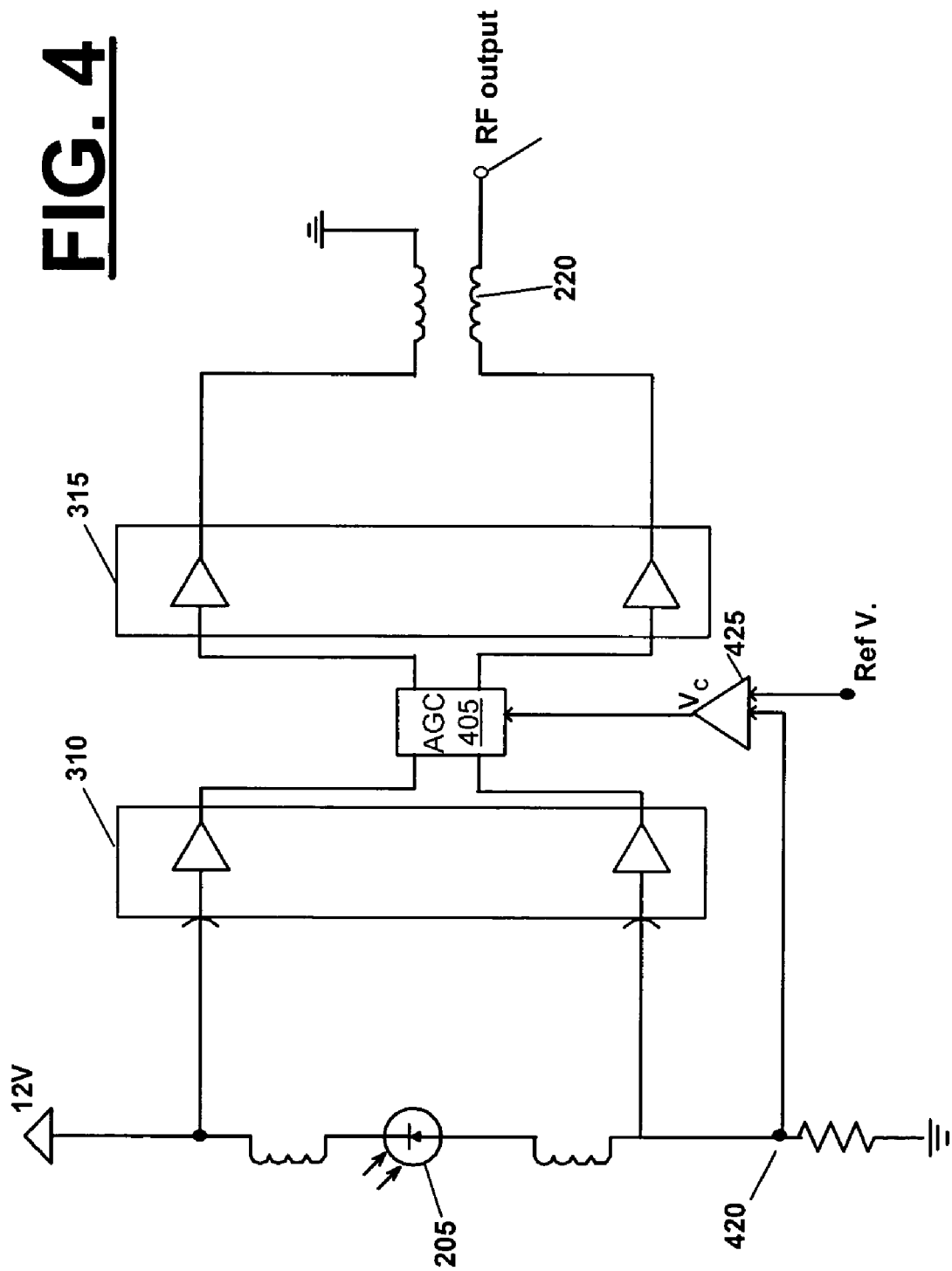
FIG. 4 is a block diagram of an optical receiver including the open loop automatic gain control (AGC) circuit in accordance with the present invention.

FIG. 4 is a block diagram of an optical receiver including an open loop automatic gain control (AGC) circuit 405 in accordance with the present invention. In contrast with a conventional closed-loop gain control circuit such as in FIG. 3, the AGC circuit 405 of the present invention adjusts the output RF power level of the optical receiver to ensure a constant output power level while not adding losses after the output amplification stage 315 (FIG. 3). In accordance with the present invention, the optical input power is sensed with a resistor 420 that develops a voltage proportional to the optical power. Subsequently, the voltage level, i.e., the input optical power level, is compared with a desired reference voltage via a comparator 425. In accordance with the present invention, the difference voltage Vc at the output of the comparator 425 is provided to the AGC circuit 405.

Figure 6:
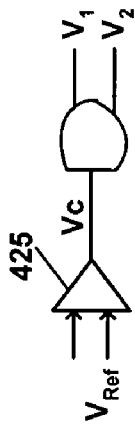
FIG. 6 is a circuit that is suitable for use in providing two varying voltages from the supplied difference voltage and the two varying voltages are providing to the circuit of FIG. 5.
Figure 5:
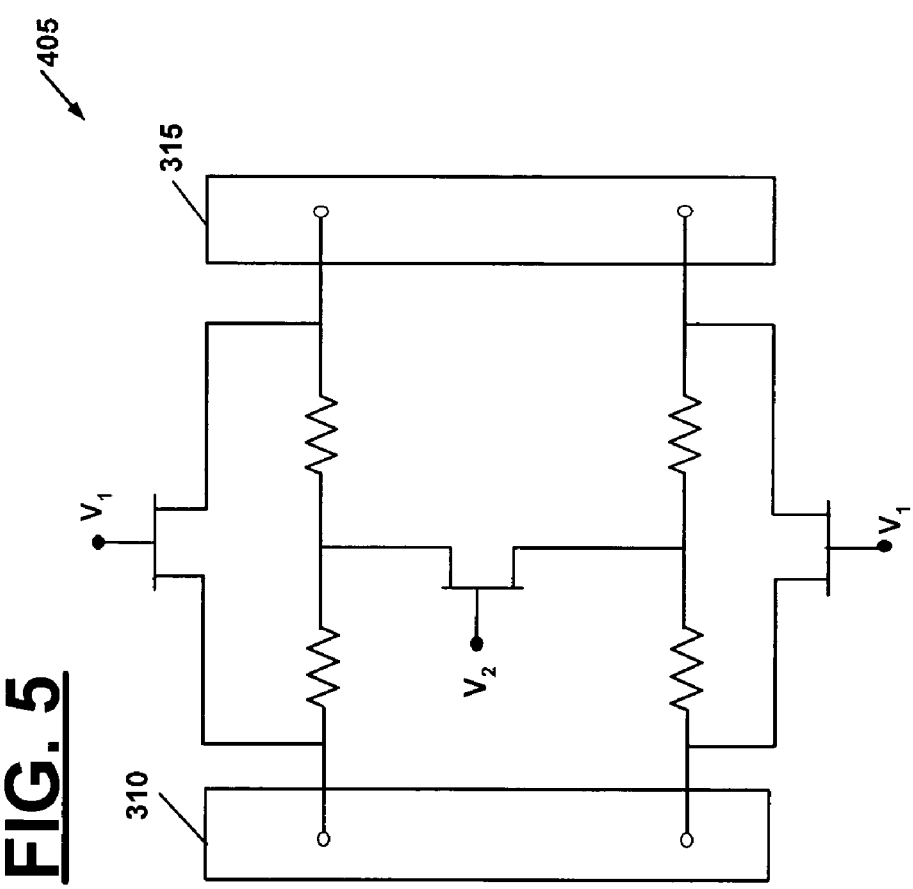
FIG. 5 is a schematic of the AGC circuit in accordance with the present invention that is suitable for use in the optical receiver of FIG. 4.

FIG. 5 is a block diagram of a preferred embodiment of the AGC circuit 405 in accordance with the present invention. The AGC circuit 405 includes a radio frequency (RF) section comprising an RF attenuator using a bridged-T network. The bridged-T network attenuator uses voltages V1 and V2. Referring to FIG. 6, Vc is converted into two voltages, V1 and V2, that vary in opposite directions. V1 and V2 are subsequently provided to three field effect transistors (FETs) that attenuate the RF voltage provided by the input amplification stage 310. The output amplification stage 315 then amplifies the attenuated voltage. It will be appreciated that there are other ways of attenuating the voltage using an RF network, such as using variable gain amplifiers in the AGC circuit 405 and, therefore, the preferred embodiment illustrated is not meant to limit the invention.

Figure 7:
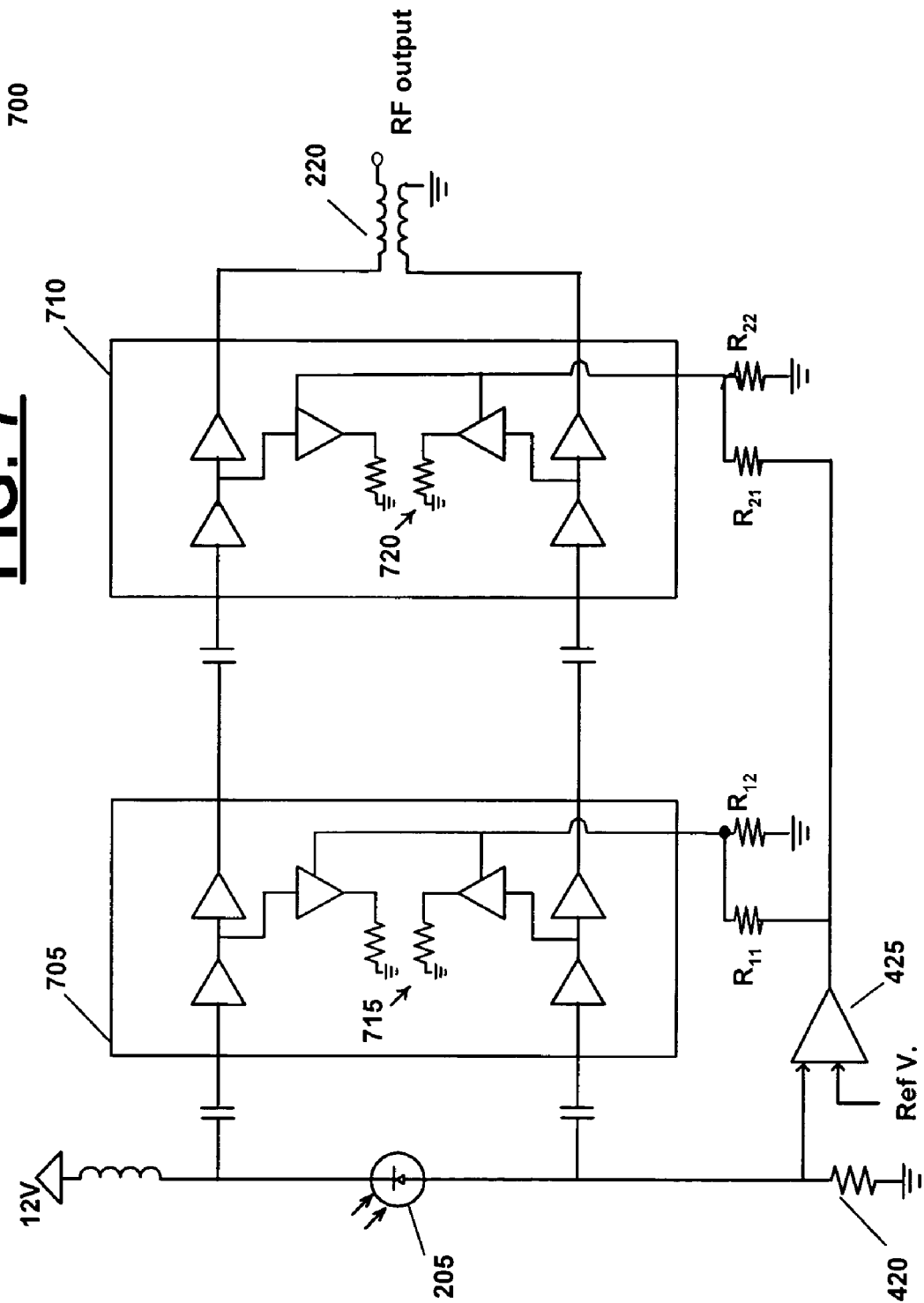
FIG. 7 illustrates a second embodiment of the open-loop AGC circuit of FIG. 4.

FIG. 7 illustrates a schematic of a second embodiment of the open-loop AGC circuit 405 (FIG. 4). The comparator 425 delivers the control voltage to vary the gain to the amplification stages 705, 710 via resistive networks R11, R12, and R21, R22. The amplification stages 705, 710 are variable gain stages where the amount of RF current diverted to internal dummy loads 715, 720 is controlled by the gain control voltage from the comparator 425. It will be appreciated that the amount of attenuation introduced by each amplification stage 705, 710 may be modified by the resistance ratio of R11, R12 and R21, R22, respectively. By way of example, the input amplification stage 705 may be attenuated by 20% and the output amplification stage 710 may be attenuated by 80%. Importantly, the use of multiple gain-controlled networks provides increased gain while optimizing the optical receiver 700 for noise and distortion contributions. The benefit of applying a varying attenuation ratio is to optimize noise and distortion performance over the full operating range of the input and output levels.

In summary, the automatic gain control circuits of FIG. 4 and FIG. 7 in accordance with the present invention is included in optical receivers to ensure a constant output level without presenting any additional losses. Accordingly, the RF output signal does not fluctuate due to any changes in the distribution network or laser drifting to name but a few. Significantly, the present invention aids in the proper processing of the received signals.

What is claimed is:

1. An optical receiver configured to receive optical signals and to convert the optical signals to electrical signals, comprising:

a photodiode;

an input and an output amplification stage; and an open-loop automatic gain control (AGC) circuit positioned between the input and output amplification stages;

the AGC circuit further comprising:

a resistor coupled to the photodiode, the resistor configured to receive electrical signals from the photodiode and produce an input optical voltage in proportion to an input optical power level;

a comparator configured to compare the input optical voltage with a reference voltage and provide a difference voltage; and a converter coupled to the comparator, the converter configured to receive the difference voltage and output two varying voltages, that vary in opposite directions; and attenuation circuit configured to receive the two varying voltages and output an attenuated electrical signal to the output amplification stage, whereby any fluctuation in the input optical power level is corrected, ensuring a constant output power level, wherein the attenuation circuit comprises a first and a second field effect transistor (FET) that each receives a same one of the two varying voltages and a third FET that receives another of the two varying voltages, the first and second FETs electrically coupling the input and output amplification stages and the third FET electrically coupling nodes between respective source and drain electrodes of the first and second FETs.

2. The optical receiver of claim 1, wherein the attenuation circuit further comprises a bridge-T circuit, and wherein the two varying voltages are applied to the bridge-T circuit.

3. The optical receiver of claim 1, further comprising: an output transformer for converting the output of the attenuation circuit into RF signals having the constant output power level.

4. An automatic gain control (AGC) circuit configured to sense an input optical power level and to adjust a gain level of amplified electrical signals in accordance with the input optical power level, comprising:

a resistor configured to receive electrical signals from a photodiode and produce an input optical voltage in proportion to the input optical power level;

a comparator configured to compare the input optical voltage with a reference voltage and provide a difference voltage;

a converter coupled to the comparator, wherein the converter receives the difference voltage and outputs two varying voltages, that vary in opposite directions; and an attenuation circuit configured to receive the two varying voltages from the converter and output an attenuated electrical signal to an output amplification stage, whereby any fluctuation in the input optical voltage is corrected, ensuring a constant output power level, wherein the attenuation circuit comprises a first and a second field effect transistor (FET) that each receives a same one of the two varying voltages and a third FET that receives another of the two varying voltages, the first and second FETs electrically coupling the input and output amplification stages and the third FET electrically coupling nodes between respective source and drain electrodes of the first and second FETs.

5. The AGC circuit of claim 4, wherein the attenuation circuit further comprises a bridge-T circuit, and wherein the two varying voltages are applied to the bridge-T circuit.

6. A method of adjusting a gain level of amplified electrical signals in accordance with an input optical power level of a circuit, the method comprising:

receiving an input optical voltage in proportions to the input optical power level;

comparing the input optical voltage with a reference voltage and providing a difference voltage;

converting the difference voltage into two varying voltages, that vary in opposite directions;

providing a first one of the two varying voltages to each of a first and a second field effect transistor (FET) and a second one of the two varying voltages to a third FET of an attenuation circuit, wherein the third FET electrically couples nodes between respective source and drain electrodes of the first and second FETs; and amplifying an output of the attenuation circuit, whereby any fluctuation in the input optical voltage is corrected, ensuring a constant output power level.

* * * * *

UNITED STATES PATENT AND TRADEMARK OFFICE
CERTIFICATE OF CORRECTION

PATENT NO. : 7,599,629 B2  Page 1 of 1
APPLICATION NO. : 10/456817
DATED : October 6, 2009
INVENTOR(S) : Kamali et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1019 days.

Signed and Sealed this

Twenty-eighth Day of September, 2010

David J. Kappos
*Director of the United States Patent and Trademark Office*